US009066505B1

(12) United States Patent
Vedder (10) Patent No.: US 9,066,505 B1
(45) Date of Patent: Jun. 30, 2015

(54) FISHING LURE

(71) Applicant: Matthew Vedder, Islamorada, FL (US)

(72) Inventor: Matthew Vedder, Islamorada, FL (US)

( * ) Notice: Subject to any disclaimer, the term of this patent is extended or adjusted under 35 U.S.C. 154(b) by 277 days.

(21) Appl. No.: 13/855,345

(22) Filed: Apr. 2, 2013

Related U.S. Application Data (63) Continuation-in-part of application No. 29/430,487, filed on Aug. 27, 2012, now Pat. No. Des. 679,362.

(51) Int. Cl.
*A01K 85/01* (2006.01)

(52) U.S. Cl.
CPC ........................................ *A01K 85/01* (2013.01)

(58) Field of Classification Search
CPC .................................................. A01K 85/01
USPC ............................................. 43/42.06, 42.02
See application file for complete search history.

(56) References Cited

U.S. PATENT DOCUMENTS

| | | | | |
|---|---|---|---|---|
| 3,744,174 | A * | 7/1973 | Lund ............................. | 43/42.06 |
| 4,098,017 | A * | 7/1978 | Hall ............................. | 43/42.06 |
| 4,102,075 | A * | 7/1978 | Wagner et al. ............... | 43/42.06 |
| 4,646,463 | A * | 3/1987 | Koch ............................ | 43/43.13 |
| 5,276,992 | A * | 1/1994 | Kato ............................ | 43/42.06 |
| 6,354,037 | B2 * | 3/2002 | Coppola, Jr. ................. | 43/42.06 |
| 6,408,565 | B1 * | 6/2002 | Duncan ........................ | 43/42.06 |
| 7,131,233 | B1 * | 11/2006 | Preston ........................ | 43/42.06 |
| 2008/0104876 | A1 * | 5/2008 | Ito ............................... | 43/42.06 |

* cited by examiner

*Primary Examiner* — Darren W Ark
*Assistant Examiner* — Marc Burgess
(74) *Attorney, Agent, or Firm* — H. John Rizvi; Gold & Rizvi P.A.

(57) ABSTRACT

A fishing lure comprising at least one hook and a lure attachment element are assembled to a body. The body includes a lure bait receiving cavity extending inward from a mouth opening located at a lure leading region. A series of protrusions extend radially inward from the mouth, preferably formed to resemble teeth. The body additionally includes a series of spatially arranged gills along each side thereof. Each gill includes a gill opening providing a fluid passageway passing through a body sidewall, a gill cover extending outward from a body exterior surface, and a gill aerating blade extending inward from a body interior surface and terminating at an aerating blade edge. Water flows into the bait receiving cavity, passing across the agitating and/or aerating interior blade and respective distal edge, wherein the water aerates discharging bubbles. The bait and/or bubbles are provided to attract fish to the lure.

13 Claims, 8 Drawing Sheets

FISHING LURE

CROSS-REFERENCE TO RELATED APPLICATION

This Non-Provisional Continuation-In-Part Utility application claiming the benefit of U.S. Design patent application Ser. No. 29/430,487, filed on Aug. 27, 2012, (Issuing as U.S. Pat. D679,362 on Apr. 2, 2013) which is incorporated herein in its entirety.

FIELD OF THE INVENTION

The present disclosure generally relates to a fishing lure. More particularly, the present disclosure relates to a fishing lure having a feature for retaining a volume of bait and features for aerating and disturbing or agitating passing water.

BACKGROUND OF THE INVENTION

Fishing lures are a key element used during fishing. The fishing lure is attached to a distal end of a fishing line. In a majority of the applications, the fishing line is threaded through a series of eyelets spatially arranged along a length of a fishing rod and collected about a fishing line drum of a fishing reel.

Fishing lures are available in many shapes and styles, each having unique features making that particular lure more desirable over competing lures. Each lure is designed with a single goal: having features that attract and catch more fish than the other competing lures.

Fishing lures provide movement, vibration, and color to catch the fish's attention so it bites one of the hooks attached to the lure. The fishing lures are all manufactured having different designs, wherein the designs are employed to resemble prey for the fish or designed to appeal to a fish's sense of territory, curiosity or aggression. Most lures are made to look like dying, injured, or fast moving fish. Lures can be classified into a variety of categories, including the following types: a jig, surface lures (sometimes referred to as top water lures, poppers, and stickbaits), spoon lures, plugs, artificial flies, soft bait lures (commonly resembling fish, squid, worms, lizards, frogs, and the like), spinner baits, swimbait (commonly resembling actual baitfish), and the like.

The fishing lures are equipped with at least one hook. The hook can be configured as a single hook, a double hook, or treble hooks that are used to hook the fish when the fish attacks the lure. The hook is provided to retain engagement between the fish and the fishing line.

What is desired is a lure with one or more features for attracting fish thereto, wherein the lure attracts and catches more fish than the competing lures.

SUMMARY OF THE INVENTION

The basic inventive concept provides a fishing lure having at least one feature that enhances the attraction of fish over competing products. The exemplary fishing lure includes a bait retention cavity and a water aerating and/or agitating feature.

A first aspect of the present invention provides a fishing lure comprising:

a fishing lure body defined by a leading surface and a trailing surface, the lure having:

a bait receiving cavity defined by an interior surface of the fishing lure body, the bait cavity extending inwards from a lure mouth opening formed at the leading surface;

a series of gills spatially arranged along a forward portion of each side of the fishing lure body, each gill comprising:

a gill opening providing a fluid passageway through the fishing lure body enabling water to pass from an exterior region into the bait receiving cavity, and a water funneling opercular fin extending outward from an exterior surface of the fishing lure body, wherein each water funneling opercular fin is located rearward of each respective gill opening, a lure attachment leading element located at a leading surface of the fishing lure body, wherein the lure attachment leading element is located at a position optimized for attachment to a fishing line; and at least one fishing hook carried by the fishing lure body.

A second aspect of the present invention shapes the fishing lure body to resemble a fish.

In another aspect, each gill further comprises a gill aerating interior blade extending inward from the interior surface of the fishing lure body and oriented extending rearward therefrom, the gill aerating interior blade terminating at a gill aerating arch blade.

In another aspect, at least one fishing hook eyelet is incorporated into the fishing lure body.

In yet another aspect, one fishing hook eyelet is located at a trailing end of the fishing lure body.

In yet another aspect, one fishing hook eyelet is located at a central portion of the fishing lure body.

In yet another aspect, the fishing lure further comprises at least one protrusion extending radially inward from the fishing lure mouth opening.

In yet another aspect, the at least one protrusion is shaped to resemble a fishes tooth.

In yet another aspect, the at least one protrusion is designed to retain a volume of bait within the bait receiving cavity.

In another aspect, the gills are spatially arranged along a length of the bait receiving cavity.

In yet another aspect, the fishing lure further comprises a diving plane extending forward from a leading portion of the lure body.

In yet another aspect, the fishing lure further comprises a diving plane extending forward and downward from a leading portion of the lure body.

In yet another aspect, the fishing lure further comprises artwork representative of the fish or of any solid color or color combination determined to aid in attracting fish to the fishing lure.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
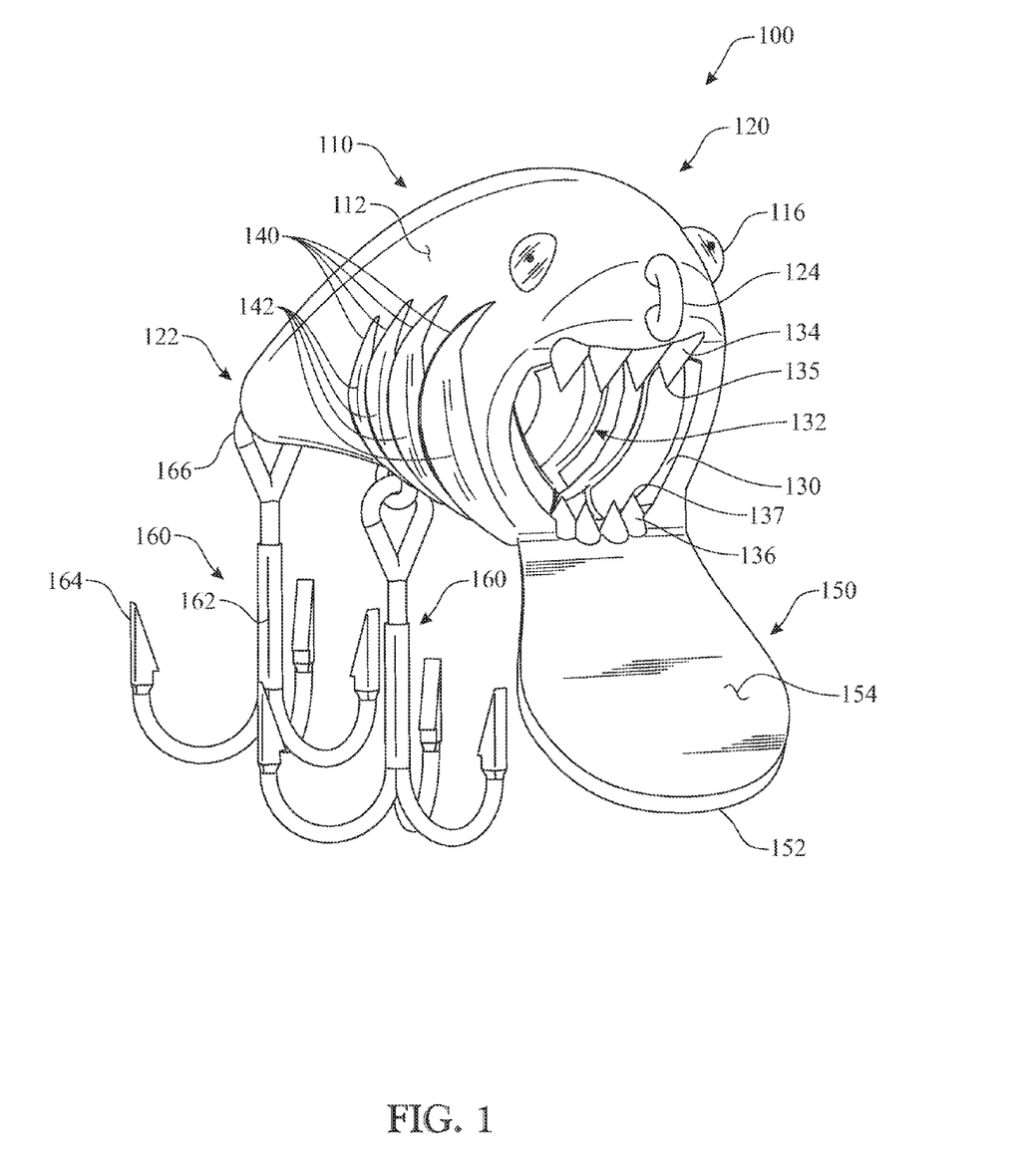
FIG. 1 presents an isometric, right side view of an exemplary fishing lure in accordance with the present invention.
Figure 2:
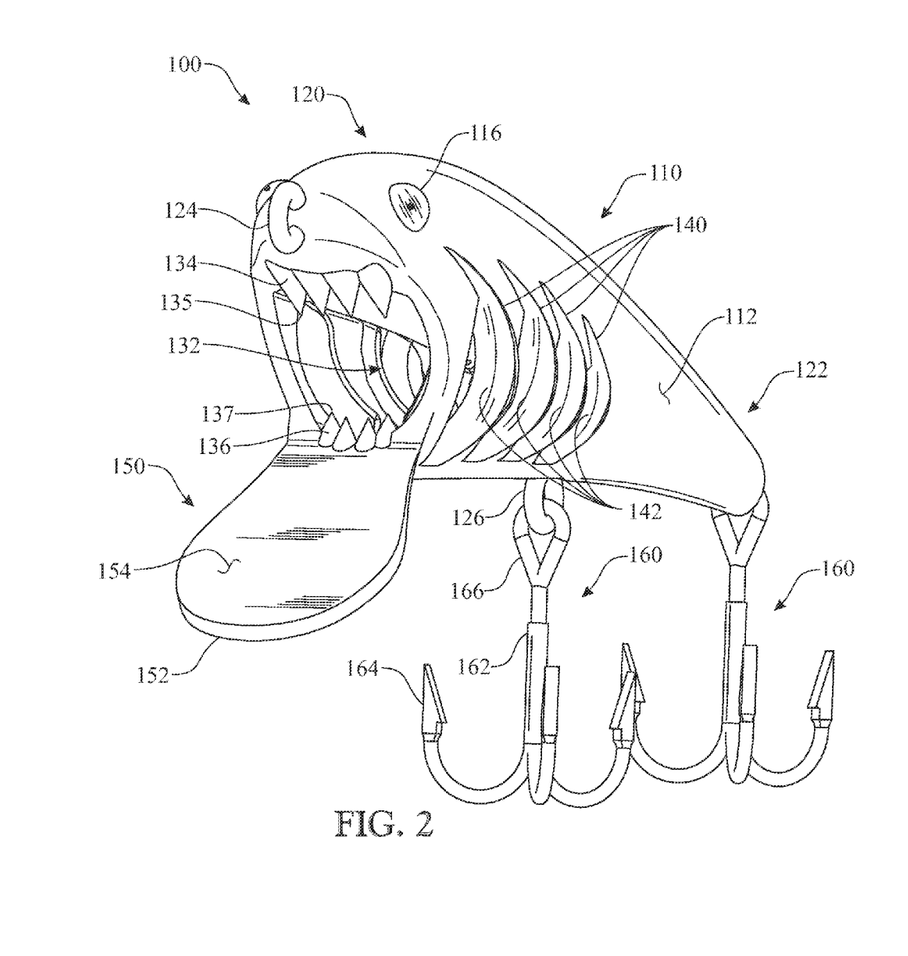
FIG. 2 presents an isometric, left side view of the exemplary fishing lure originally introduced in FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

An exemplary embodiment of an aerating fishing lure 100 is illustrated and detailed in FIGS. 1 through 8. The aerating fishing lure 100 comprises an aerating fishing lure body 110 wherein an orientation is referenced having a lure leading surface 120 and a lure trailing surface 122. The aerating fishing lure body 110 is preferably an elongated member for streamline flow through water. The aerating fishing lure body 110 can be shaped resembling a fish. The aerating fishing lure body 110 can include a lure hollowed chamber 118 to control buoyancy. A pair of lure body eyes 116 can be disposed upon a lure body exterior surface 112 of the aerating fishing lure body 110 at a location proximate the lure leading surface 120. The aerating fishing lure body 110 includes additional biological features representative of a fish, including a mouth (defined by a lure mouth opening 130) located at the lure leading surface 120 and a series of gills 140 spatially arranged along on each side of the aerating fishing lure body 110. The lure body exterior surface 112 of the aerating fishing lure body 110 can include artwork representative of the fish or of any solid color or color combination determined to aid in attracting fish to the aerating fishing lure 100. The artwork can be applied using any application process known by those skilled in the art, including printing, painting, appliqués, impregnated molding, and the like.

Figure 3:
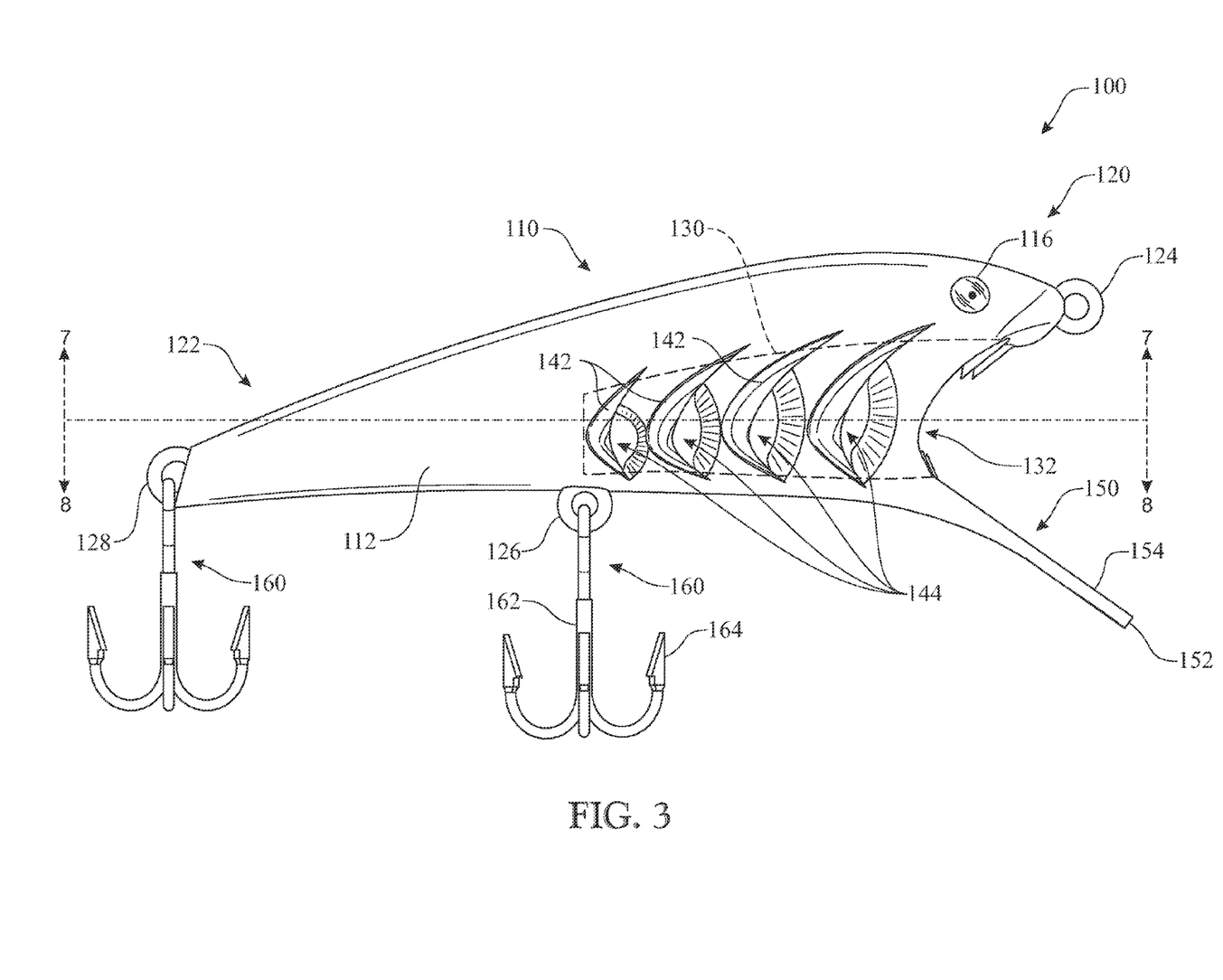
FIG. 3 presents a side elevation view of the exemplary fishing lure originally introduced in FIG. 1.
Figure 4:
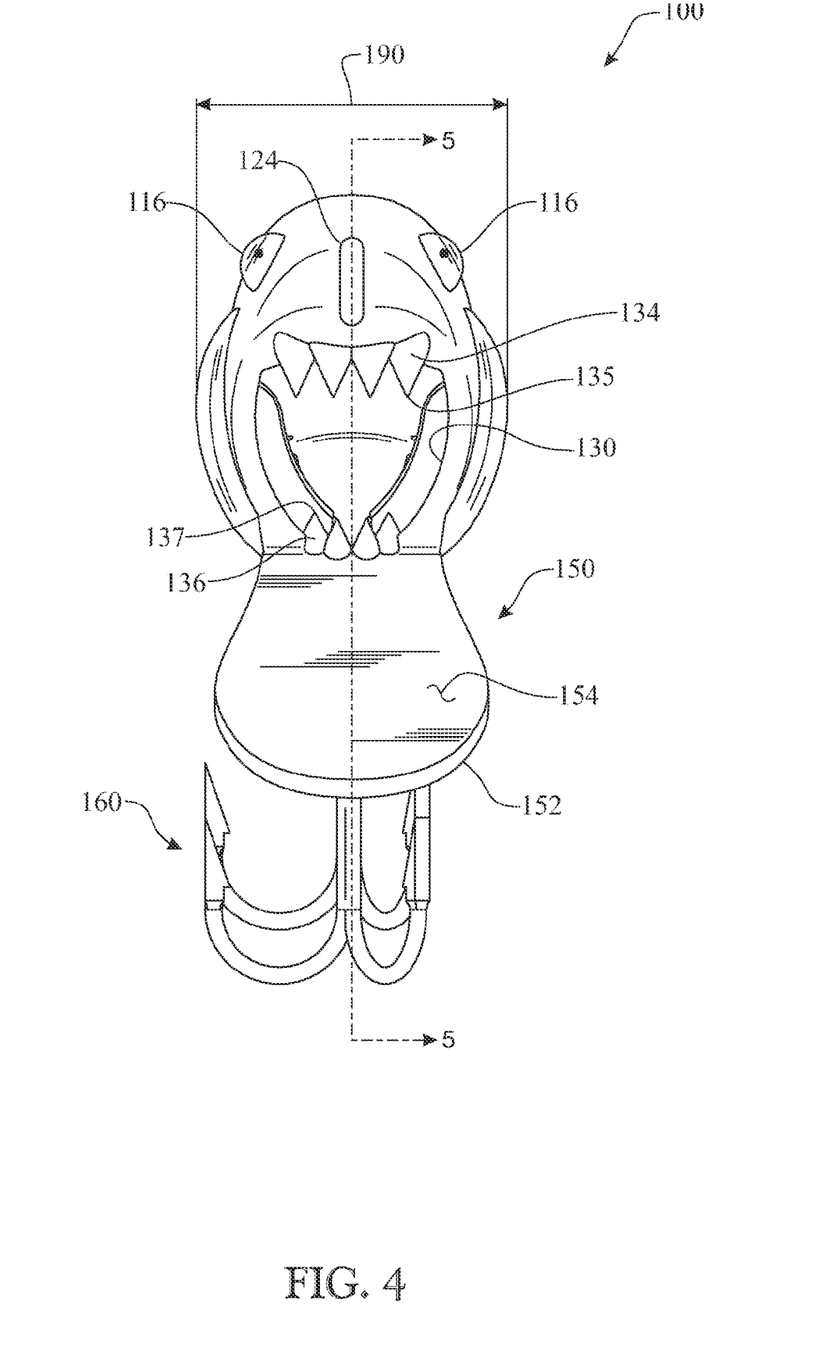
FIG. 4 presents a front elevation view of the exemplary fishing lure originally introduced in FIG. 1.

The aerating fishing lure 100 includes various elements to adapt the lure body exterior surface 112 for catching fish. These various elements include a lure attachment leading eyelet 124 for attaching a fishing line 210 (FIG. 5) thereto and at least one exemplary hook subassembly 160 for retention of a fish to the aerating fishing lure 100. The lure attachment leading eyelet 124 is attached to the aerating fishing lure body 110, wherein the lure attachment leading eyelet 124 is located at a lure leading surface 120 of the fishing lure body 110, at a position optimized for attachment to a fishing line 210. It is understood that the lure attachment leading eyelet 124 can be any attachment element. The fishing line 210 can be secured to the attachment element 124 using any suitable knot, including a Bimini twist, a half blood or clinch knot, a Palomar knot, and the like. The at least one exemplary hook subassembly 160 can be integrated directed to the aerating fishing lure body 110 or the exemplary hook subassembly 160 can be attached to the aerating fishing lure body 110 by a respective hook carrying eyelet 126, 128. The exemplary hook subassembly 160 include a hook tip 164 formed at a distal end of a hook shank 162 and, when including a respective hook carrying eyelet 126, 128, a hook eyelet 166 formed at an attachment end of the hook shank 162. The exemplary hook subassembly 160 can be selected from any known design, including a single hook, a double hook, or a treble hook. The exemplary embodiment is shown having a treble hook 160. The exemplary embodiment attaches a leading exemplary hook subassembly 160 at a central, lower location on the aerating fishing lure body 110 by a lure central hook carrying eyelet 126 and a trailing exemplary hook subassembly 160 at a trailing location of the aerating fishing lure body 110 by a lure trailing hook carrying eyelet 128, as best shown in FIG. 3. It is understood that the lure central hook carrying eyelet 126 can be located along a lower edge of the aerating fishing lure body 110 and centrally positioned to adequately balance the aerating fishing lure 100 during use.

Figure 6:
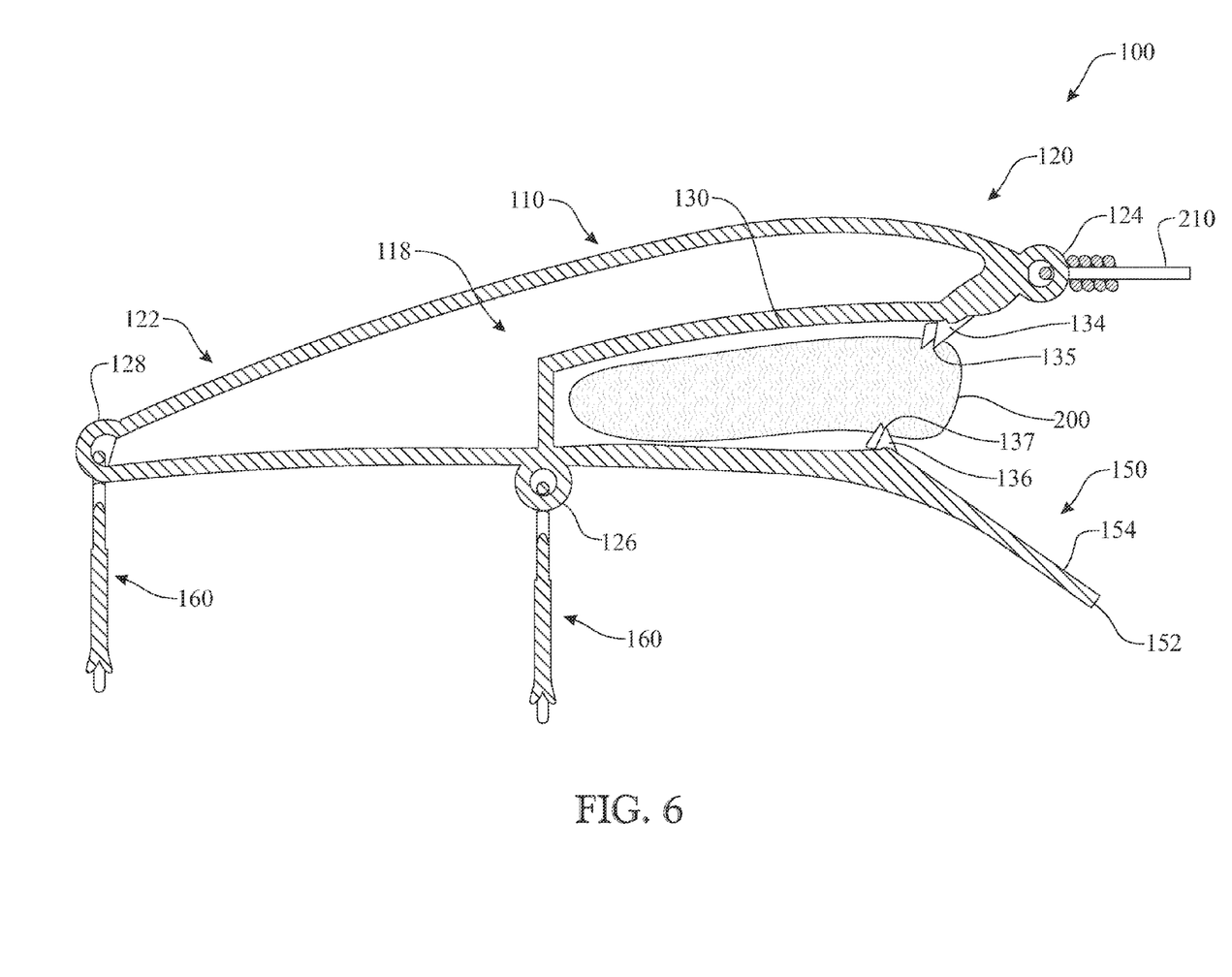
FIG. 6 presents a sectioned side elevation view of the exemplary fishing lure as illustrated in FIG. 5, further comprising a volume of bait inserted within a bait receiving cavity.

Returning to the fish attracting features, the lure mouth is defined by a lure mouth opening 130. A lure mouth bait receiving cavity 132 (or alternatively referred to as a water intake cavity 132) extends into the aerating fishing lure body 110 from the lure mouth opening 130. One or more lure upper teeth 134 can be formed along an upper portion of the lure mouth opening 130. The lure upper teeth 134 can be shaped having a lure upper teeth edge 135, wherein the lure upper teeth 134 are shaped to retain bait 200 within the lure mouth bait receiving cavity 132, as shown in FIG. 6. The lure upper teeth 134 can be shaped where the lure upper teeth edge 135 is wedge shaped or comprises a pointed edge to embed into the bait 200 to ensure retention of the bait 200 within the lure mouth bait receiving cavity 132. One or more lure lower teeth 136 can be formed along a lower portion of the lure mouth opening 130. The lure lower teeth 136 can be shaped having a lure lower teeth edge 137, wherein the lure lower teeth 136 are also shaped to retain bait 200 within the lure mouth bait receiving cavity 132, as shown in FIG. 6. The lure lower teeth 136 can be shaped where the lure lower teeth edge 137 is wedge shaped or comprises a pointed edge to embed into the bait 200 to ensure retention of the bait 200 within the lure mouth bait receiving cavity 132. The lure upper teeth 134 and lure lower teeth 136 also designed to provide a gap between the bait 200 and the lure mouth opening 130, allowing water flow into the lure mouth bait receiving cavity 132.

Figure 5:
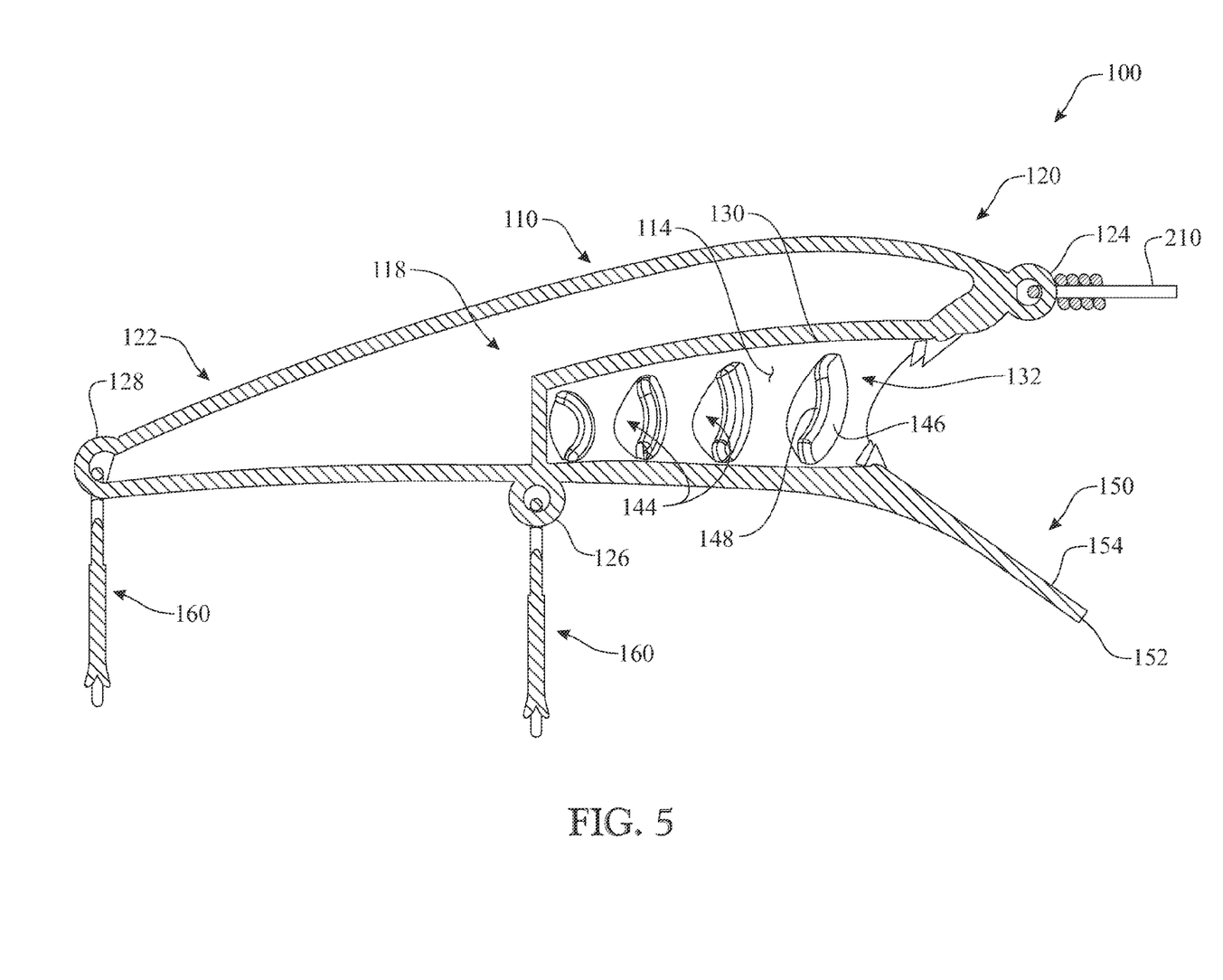
FIG. 5 presents a sectioned side elevation view of the exemplary fishing lure, wherein the section is taken along section line 5-5 of FIG. 4.

Each of the gills 140 is formed including a gill exterior water funneling opercular fin 142 (sometimes referred to as a gill cover) extending outward from the lure body exterior surface 112, a gill openings 144 passing through the aerating fishing lure body 110 providing a fluid passageway between the lure mouth bait receiving cavity 132 and a region external to the aerating fishing lure body 110. Each gills 140 includes a gill aerating interior blade 146 extending inward and preferably rearward from the lure body interior surface 114 and terminating at a gill aerating arch blade 148 (FIG. 5). The gill aerating interior blades 146 in conjunction with their respective gill aerating arch blade 148 provides several additional features, including: (1) generating turbulence or supercavitation of fluid passing through the lure mouth bait receiving cavity 132 and (2) additional retention of bait 200 within the lure mouth bait receiving cavity 132. The gill aerating interior blade 146 is angled rearward, retaining contents inserted within the gill aerating interior blade 146 therein.

The aerating fishing lure 100 is secured to a distal end of the fishing line 210 used in conjunction with a fishing device. While the preferred fishing device is a fishing rod (not shown), it is understood that the fishing device can be any suitable form factor. In operation, the aerating fishing lure 100 provides two distinct functions for attracting fish. A first function is the inclusion of the lure mouth bait receiving cavity 132 for carrying the bait 200. The scent of the bait 200 would attract fish to the aerating fishing lure 100. The bait 200 is inserted through the lure mouth opening 130 and into the lure mouth bait receiving cavity 132 as best shown in FIGS. 5 and 6. The lure upper teeth 134 and lure lower teeth 136 extending generally radially inward and slightly rearward from the lure mouth opening 130 retain the bait 200 within the lure mouth bait receiving cavity 132. The bait 200 can be a small fish, a compact volume of chum, a manufactured fish attracting composition, fish food, pellet inserts, and the like. The lure upper teeth 134 and lure lower teeth 136 are shaped to retain a flow passageway between the bait 200 and the lure mouth opening 130, allowing water to flow into the lure mouth bait receiving cavity 132 when the bait 200 is inserted therein.

Figure 7:
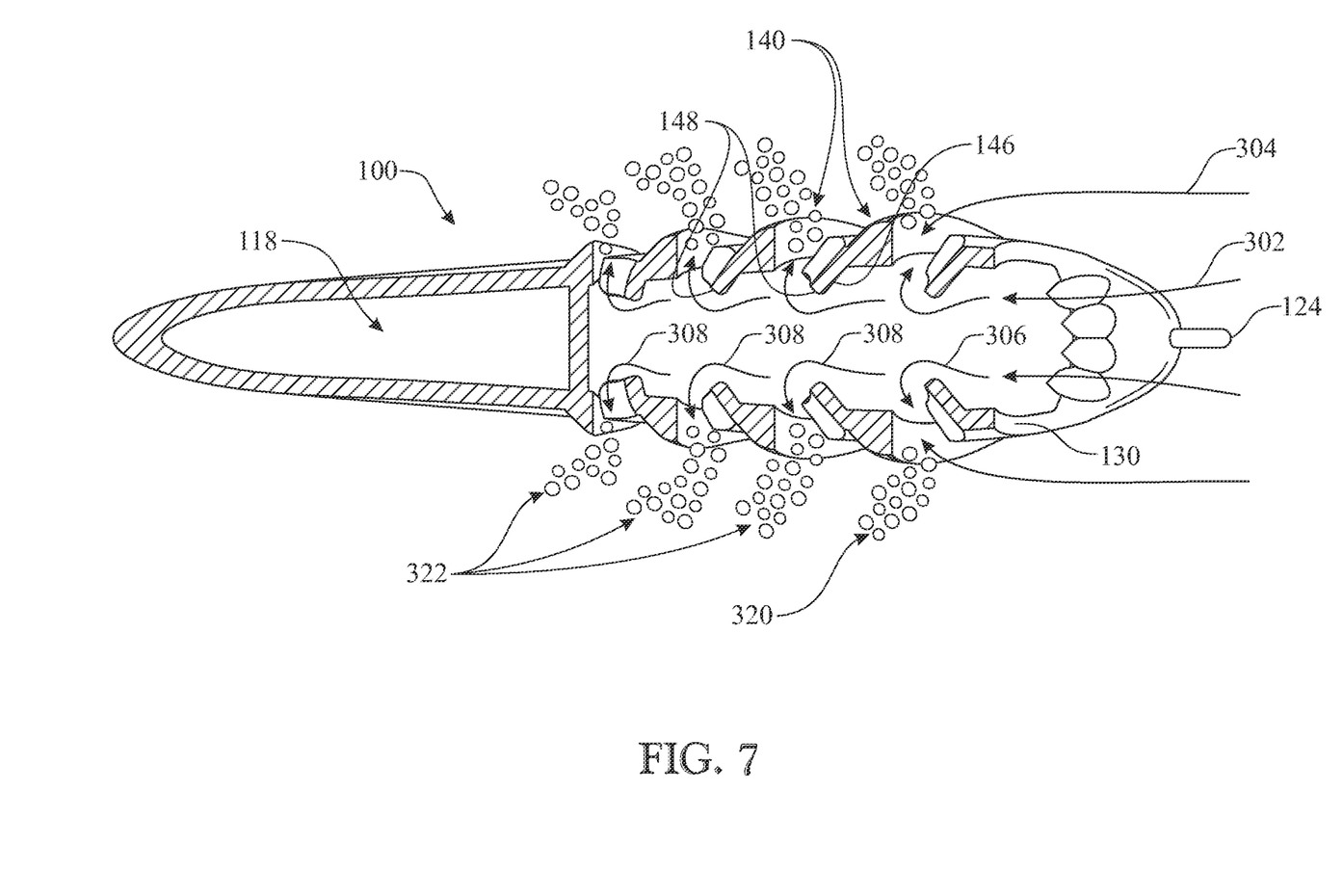
FIG. 7 presents a sectioned plan view of the exemplary fishing lure, wherein the section is taken along section line 7-7 of FIG. 3.
Figure 8:
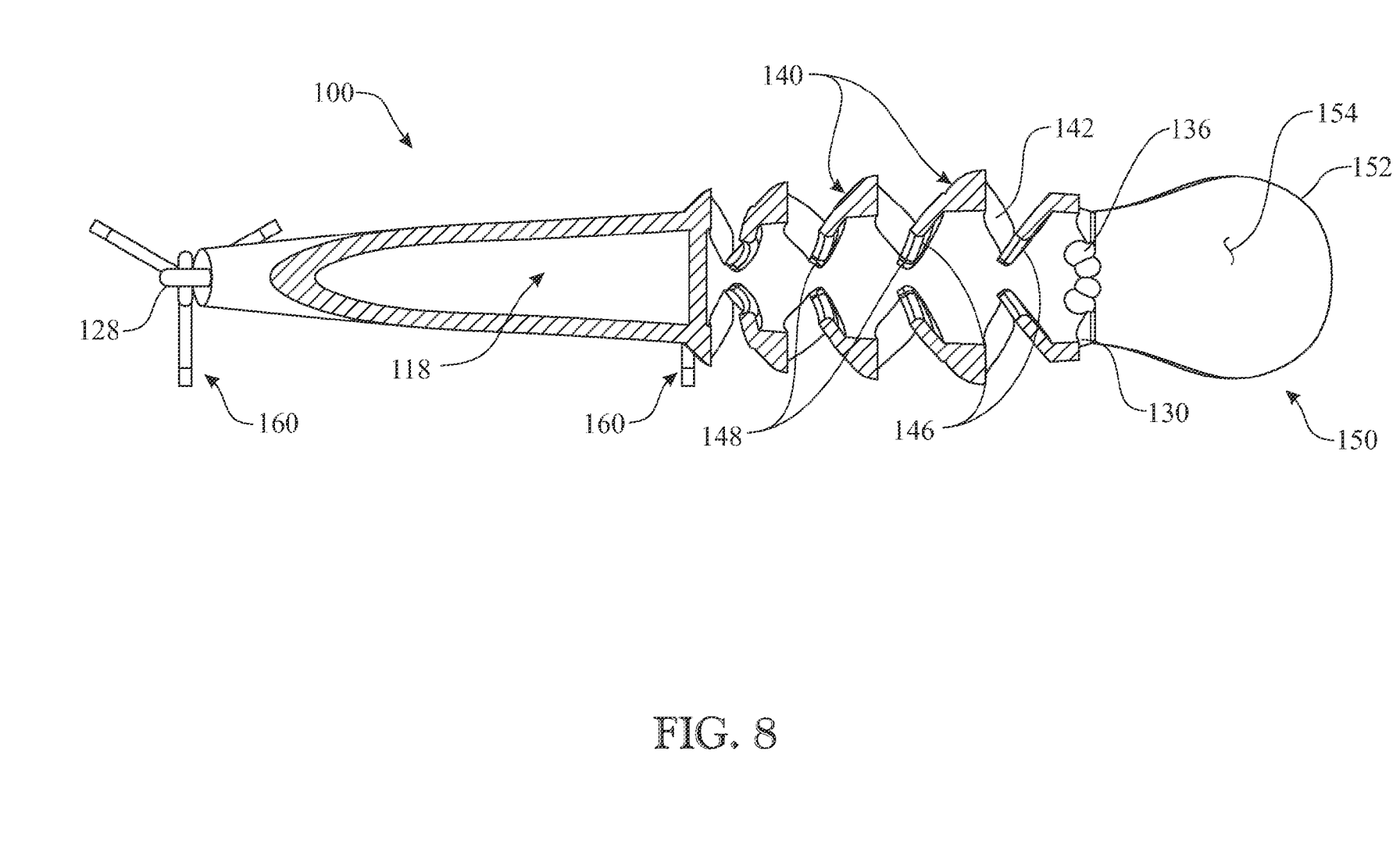
FIG. 8 presents a sectioned plan view of the exemplary fishing lure, wherein the section is taken along section line 8-8 of FIG. 3.

A second function is provided by the gills 140. Each gills 140 is designed to aerate water flowing into the lure mouth bait receiving cavity 132 and/or into the gill openings 144 of the leading gills 140. Water is presented to the frontal area 190 (FIG. 4) and enters through the frontal exposed openings and is discharged through the non-frontal exposed openings. The flow of the water is represented in FIG. 7. Water flows into the lure mouth bait receiving cavity 132 primarily through the lure mouth opening 130 (reference as mouth intake water flow 302) and having some additional flow through the leading pair of gills 140 (referenced as gill intake water flow 304). The water flows past each gill aerating interior blade 146, wherein the gill aerating interior blade 146 acts as a dam compressing the flowing fluid. Each gill aerating arch blade 148 causes a difference in pressure and shearing to the fluid passing thereby. The difference in pressure and shearing draws air from the water, generating aeration 320, 322. The frontal gill aeration 320 is limited by the gill intake water flow 304, directing a majority of the aeration to be discharged through the trailing gills 140, which is referenced as trailing gills aeration 322. A small portion of the water collected within the lure mouth bait receiving cavity 132 is discharged through the leading gills 140, wherein the flow is referenced as frontal gill water flow 306. A majority of the water collected within the lure mouth bait receiving cavity 132 is discharged through the trailing gills 140, wherein the flow is referenced as trailing gills water flow 308. The aerated bubbles 320, 322 would trail the aerating fishing lure 100 (as illustrated) as the aerating fishing lure 100 is pulled forward through the water. The discharged aerated bubbles 320, 322 are formed to attract fish to the aerating fishing lure 100.

A diving plane 150 can be integrated into the shape of the aerating fishing lure body 110 or attached as a secondary member. The diving plane 150 is formed having a diving plane operational surface 154 defined by a diving plane body 152. Water flowing against the diving plane operational surface 154 drives the aerating fishing lure 100 downward from a surface of the water. The diving plane body 152 can be configured at any suitable angle to generate a predetermined downward force.

The aerating fishing lure 100 can be manufactured using any form of shaping processes capable of forming the desired shape of the aerating fishing lure 100. This can include injection molding, machining, three-dimensional printing, and the like. The aerating fishing lure body 110 can be fabricated using a single step manufacturing process forming a unitary structure or in multiple sections and subsequently assembled together. The aerating fishing lure body 110 can be subsequently colored by any suitable process, including printing, painting, an indicia wrap application, and the like. The eyelets 124, 126, 128 can be integrated into the aerating fishing lure body 110, formed as a separate element and integrated into the aerating fishing lure body 110 during the molding process, formed as a separate element and subsequently assembled to the aerating fishing lure 100, and the like. The at least one exemplary hook subassembly 160 can be integrated into the aerating fishing lure body 110 during the molding process or attached using eyelets 126, 128 (as illustrated). It is understood that the exemplary hook subassembly 160 can be of any suitable style, including a single hook, a double hook, or a treble hook (as illustrated).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claim is:

1. A fishing lure comprising:
    a fishing lure body defined by a leading surface and a trailing surface, the lure having:
    a water intake cavity defined by an interior surface of the fishing lure body, the bait cavity extending inwards from a lure mouth opening formed at the leading surface;
    a series of gills spatially arranged along a forward portion of each side of the fishing lure body, each gill comprising:
        a gill opening providing a fluid passageway through the fishing lure body enabling water to pass from an exterior region into the water intake cavity,
        a water funneling opercular fin extending outward from an exterior surface of the fishing lure body, wherein each water funneling opercular fin is located rearward of each respective gill opening, and
        a gill aerating interior blade extending inward from the interior surface of the fishing lure body and oriented extending rearward therefrom, the gill aerating interior blade terminating at a gill aerating arch blade;
    a lure attachment leading element located at a leading surface of the fishing lure body, wherein the lure attachment leading element is located at a position optimized for attachment to a fishing line; and
    at least one fishing hook carried by the fishing lure body.

2. A fishing lure as recited in claim 1, wherein the fishing lure body is shaped resembling a fish.

3. A fishing lure as recited in claim 1, wherein at least one gill on each side of the lure body is exposed to a frontal area.

4. A fishing lure as recited in claim 1, further comprising at least one protrusion extending radially inward from the fishing lure mouth opening.

5. A fishing lure as recited in claim 4, wherein each at least one protrusion is shaped resembling a tooth.

6. A fishing lure as recited in claim 4, wherein each at least one protrusion is shaped to retain bait within the water intake cavity.

7. A fishing lure as recited in claim 4, wherein each at least one protrusion is shaped enabling passage of water into the water intake cavity when bait is inserted into the water intake cavity.

8. A fishing lure comprising:
- a fishing lure body defined by a leading surface and a trailing surface, the lure having:
- a water intake cavity defined by an interior surface of the fishing lure body, the bait cavity extending inwards from a lure mouth opening formed at the leading surface;
- a series of gills spatially arranged along a forward portion of each side of the fishing lure body, each gill comprising:
  - a gill opening providing a fluid passageway through the fishing lure body enabling water to pass from an exterior region into the water intake cavity,
  - a water funneling opercular fin extending outward from an exterior surface of the fishing lure body, wherein each water funneling opercular fin is located rearward of each respective gill opening, and
  - a gill interior blade extending inward from the interior surface of the fishing lure body and oriented extending rearward therefrom, the gill interior blade terminating at a gill aerating blade edge;
- a lure attachment leading element located at a leading surface of the fishing lure body, wherein the lure attachment leading element is located at a position optimized for attachment to a fishing line; and
- at least one of:
  - a fishing hook assembled to a trailing end of the fishing lure body,
  - a fishing hook assembled to a central body location of the fishing lure body, and
  - a fishing hook assembled to a central body location of a lower edge of the fishing lure body.

9. A fishing lure as recited in claim 8, further comprising a diving plane extending forward from the leading surface of the fishing body lure.

10. A fishing lure as recited in claim 8, further comprising at least one protrusion extending radially inward from the fishing lure mouth opening.

11. A fishing lure as recited in claim 10, wherein each at least one protrusion is shaped resembling a tooth.

12. A fishing lure as recited in claim 10, wherein each at least one protrusion is shaped to retain bait within the water intake cavity.

13. A fishing lure as recited in claim 10, wherein each at least one protrusion is shaped enabling passage of water into the water intake cavity when bait is inserted into the water intake cavity.

\* \* \* \* \*